United States Patent [19]
Dittmeier

[11] Patent Number: 5,682,221
[45] Date of Patent: Oct. 28, 1997

[54] HYBRID TEMPLE CONNECTING ASSEMBLY FOR EYEWEAR

[75] Inventor: Paul Dittmeier, San Francisco, Calif.

[73] Assignee: Bausch & Lomb Incorporated, Rochester, N.Y.

[21] Appl. No.: 697,301

[22] Filed: Aug. 22, 1996

[51] Int. Cl.$^6$ .................................................. G02C 1/08
[52] U.S. Cl. ................................................................ 351/90
[58] Field of Search ................................ 351/90, 93, 91, 351/97, 102, 98, 99, 100, 41

[56] References Cited

U.S. PATENT DOCUMENTS

| | | | |
|---|---|---|---|
| 4,674,852 | 6/1987 | Tanaka | 351/90 |
| 4,747,680 | 5/1988 | Hatano | 351/90 |
| 4,896,955 | 1/1990 | Zider | 351/41 |

OTHER PUBLICATIONS

Advertisement in 20/20 Magazine, Nov. 1994, p. 142, and four photographs of commercial sample of product shown in ad.

Primary Examiner—Hung X. Dang
Attorney, Agent, or Firm—Katherine McGuire

[57] ABSTRACT

Apparatus for connecting a temple to a metal eyewire comprises a plastic connecting member having a first portion which extends between and is attached to first and second lateral end pieces of the eyewire, and a second portion which is angularly disposed with respect to the first portion thereof. A metal hinge assembly has first and second hinge components attached to the second portion of the connecting member and the front end of the temple, respectively, and are pivotally interconnected with a screw which extends parallel to the screw which secures the first portion of the connecting member to the lateral end pieces of the eyewire. The first metal hinge component is most preferably directly and permanently molded into the plastic connecting member at the time it is molded to provide a durable and reliable pivotal connection between the temple and metal eyewire.

7 Claims, 1 Drawing Sheet

HYBRID TEMPLE CONNECTING ASSEMBLY FOR EYEWEAR

BACKGROUND OF THE INVENTION

The present invention relates to eyewear, and more particularly relates to components for connecting a temple to a metal front.

Eyewear such as sunglasses generally comprise a front and two temples which pivotally attach to either side of the front. The front may be any of a variety of front types such as, for example, a frame with two lenses held within the frame, a frame with a unitary lens held thereby, and a unitary lens with no associated frame. In eyewear styles having a front frame which includes a right and left eyewire wherein a right and left lens are captured, respectively, an ongoing problem relates to securely and safely maintaining the lens within its associated eyewire. Particularly, it is important to secure the lens in its eyewire such that it will not accidentally pop out. It is furthermore important to secure the lens in its eyewire in a manner which does not optically distort the lens including any coating applied thereto. This type of lens distortion, termed "hoop stress" in the art, frequently results from over-tightening an eyewire about a lens. Thus, while it is important to firmly secure a lens in its eyewire, this goal must be balanced with the goal of maintaining a distortion-free lens.

The materials from which various eyewear components are manufactured has seen much variation in recent years. Thus, eyewear styles may be made of various types of plastic or metal, with each of the individual components thereof (e.g., lenses, fronts, temples, hinges) being made from one or various combinations thereof. For example, an eyewear style may have a metal front with plastic temples or vice versa. Combining different materials in a single eyewear style presents concerns regarding compatibility and mechanical affinity between the materials employed. This is in addition, of course, to the above-noted concerns regarding proper eyewire-to-lens securement. It is thus common in eyewear styles employing more than one material type to experience mechanical failure at one point or another, for example, breaking at the hinge or temple, accidental lens dislodgment and/or distortion, screw loosening, etc. There thus exists a need in an eyewear having components of different material types of an assembly which interconnects the individual components of the eyewear together in a secure, safe and reliable manner.

SUMMARY OF THE INVENTION

The present invention addresses the above needs and concerns by providing a secure, durable, and aesthetically pleasing connecting assembly for eyewear, especially eyewear employing metallic eyewires or fronts. More particularly, the invention comprises a plastic connecting member having co-planar first and second portions angularly disposed with respect to each other about an angle between about 90° and 180°, and most preferably of about 120°. The metallic eyewire includes first and second lateral end pieces which are separable to enable the eyewire to be passed around and secured to the edge of the lens. The first portion of the plastic connecting member is elongated and is sandwiched between the first and second lateral end pieces of the eyewire with a screw extending consecutively through the lateral end pieces and the connecting member to secure these pieces together about a respective lens. The first portion of the plastic connecting member thus acts as a buffer between the metal end pieces of the eyewire such that the degree to which the eyewire is tightened about the lens may be adjustably optimized.

A metal hinge assembly comprising first and second metal hinge components is provided with the first hinge component being fixedly secured to the second portion of the connecting member, and the second hinge component being fixedly secured to the front portion of the temple member. The temple member itself may be made of any desired material, e.g., metal or plastic. The second hinge component may be attached to the temple or may be integrally formed therewith. In the preferred embodiment, the first hinge component is directly molded into the plastic connecting member and, in the case of a plastic temple, the second hinge component is molded into the temple, at the time the connecting member and temple are manufactured, respectively. Thus, with the first portion of the connecting member secured to the eyewire and the first and second hinge components attached to the second portion of the connecting member and front end of the temple, respectively, the hinge components are interconnected via a hinge screw thereby pivotally connecting the temple to the connecting member and the front eyewire.

DETAILED DESCRIPTION

Figure 1:
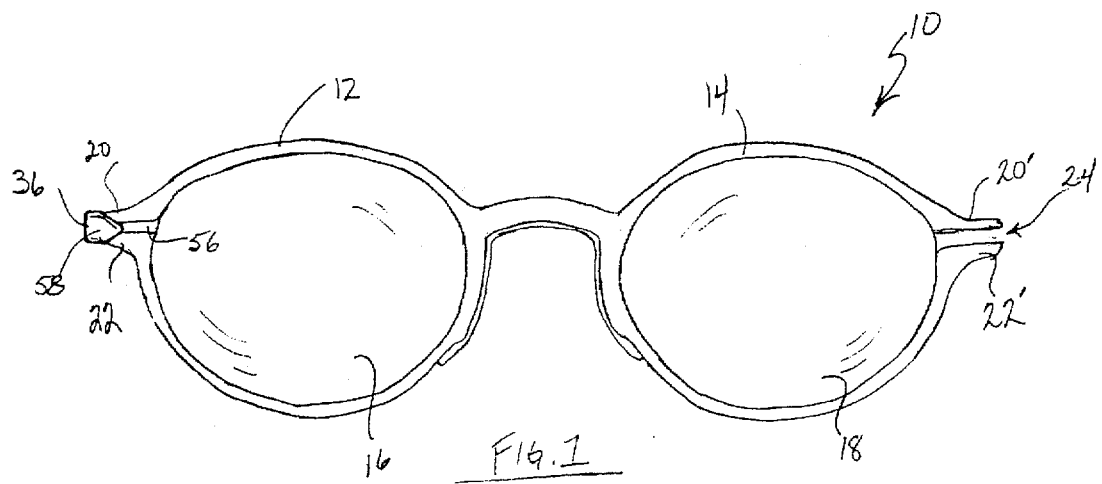
FIG. 1 is a front elevational view of an eyewear front.

Referring now to the drawing, there is seen in FIG. 1 an eyewear front 10 having first and second metal eyewires 12 and 14 for capturing a pair of lenses 16 and 18, respectively. Each eyewire 12 and 14 includes first and second lateral end pieces 20,22 and 20',22', respectively, which may be passed about a respective lens and toward each other to secure the lens in the groove of the eyewire. In the fully secured position of the lens within the eyewire, lateral end pieces 20 and 22 are slightly spaced from one another as indicated at 24 at the right lateral end of front 10 in FIG. 1. As noted previously, securement of the lens within the eyewire must be such that the lens does not accidentally pop free of the eyewire during use while also avoiding any damaging stress upon the lens.

Figure 2:
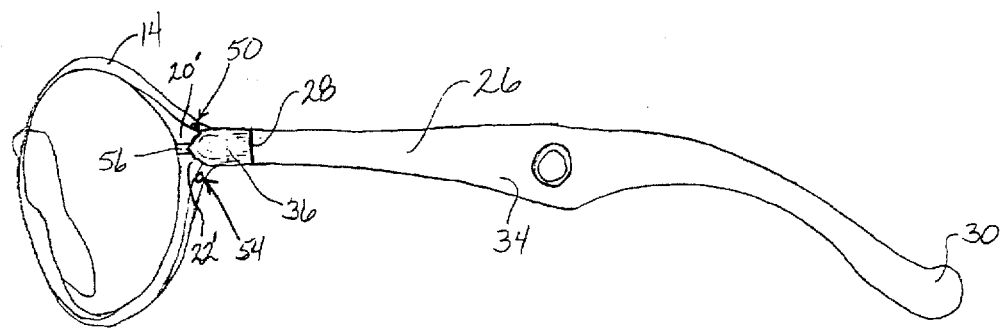
FIG. 2 is a side elevational view of the eyewear front of FIG. 1 with a temple attached to a lateral side thereof.
Figure 3:
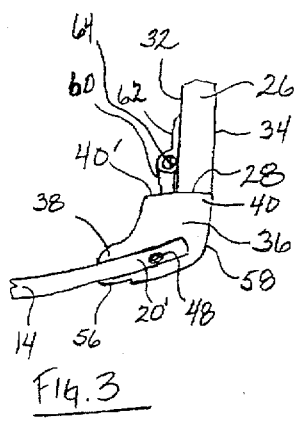
FIG. 3 is a fragmented, top plan view of the front portion of the temple attached to the connecting member and front eyewire.
Figure 4:
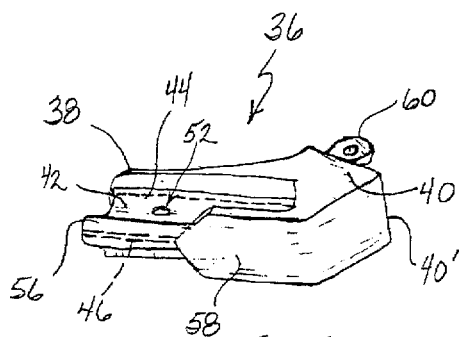
FIG. 4 is a perspective view of the connecting member.

Referring now also to FIGS. 2–4, a temple 26 is provided for attachment to metal front 10. Temple 26 includes opposite front and back ends 28 and 30 and inner and outer surfaces 32 and 34, respectively. As previously stated, temple 26 may be made of any desired material (e.g., plastic or metal).

A unitary, plastic connecting member 36 seen best in FIG. 4 has first and second portions 38 and 40 which are angularly disposed with respect to each other at an angle between about 90° and 180°, and most preferably about 120°. First portion 38 includes a recessed section 42 providing opposite top and bottom channel surfaces 44 and 46, respectively, against which the facing surfaces of lateral end pieces 20 and 22 are engaged in the fully assembled condition of the eyewear. A screw 48 (FIG. 3) is passed consecutively through aligned apertures 50, 52 and 54 formed in lateral end piece 20, section 42 and lateral end piece 22, respectively, with at least one of the apertures 50 and 54 being threaded to tighten screw 48 and thus the eyewire about the lens.

An elongated facing 56 is integrally formed along the front surface of section 42 and is intended to be visually noticeable from the front of the eyewear as seen at the left side of front 10 in FIG. 1. A widened facing section 58 integrally extends from facing 56 and continues to the end surface 40' of second portion 40.

Referring exclusively to FIGS. 3 and 4, it is seen that temple 26 is attached to front 10 via connecting member 36. More specifically, a metal hinge assembly is provided having first and second hinge components 60 and 62 attached to connector member surface 40' and to temple inner surface 32 adjacent front end 28 thereof, respectively. In order to provide a reliable and secure connection of first hinge component 60 to connector member surface 40', first hinge component 60 is integrally molded into connector member 36 at the time connector member 36 is molded. If a plastic temple member 26 is used, then the same method of attachment for second hinge component 62 may be used, i.e., second hinge component 62 is integrally molded into inner surface 32 of temple 26 at the time temple 26 is molded. If a metal temple is used, second hinge component 62 may be integrally formed therewith, or affixed subsequently thereto if desired (e.g., with rivets or adhesive).

Temple 26 is attached to connecting member 36 by aligning hinge components 60 and 62 and threading a screw 64 therethrough, with screws 64 and 48 (screw 48 passes through holes 50 and 54 in front 10) extending substantially parallel to each other. As such, temple front end 28 abuts surface 40' of connecting member 36 as seen best in FIGS. 2 and 3, with the hinge assembly being located virtually out of sight when the eyewear is worn.

It will be appreciated that the mechanical connection between the metal hinge components and temple and plastic connecting member is extremely strong, and as such provides a pivotal connection between a temple and metal eyewire which is durable and reliable.

What is claimed is:

1. Apparatus for connecting the front end of a temple having inner and outer surfaces to the lateral portion of a metal eyewire having separable first and second lateral end pieces, said apparatus comprising:

a) a plastic connector member for attaching said front end of said temple to said eyewire, said connector member having first and second portions, said first portion secured between said first and second lateral end pieces of said eyewire; and b) a metal hinge assembly having first and second hinge components, said first hinge component being secured to said second portion of said connector member and said second hinge component being secured to said inner surface adjacent said front end of said temple, said first and second hinge components of said hinge assembly being pivotally connected to each other such that said temple is pivotally movable with respect to said connector member and said front.

2. The apparatus of claim 1 wherein said first and second lateral end pieces are secured together about said first portion of said connecting member with a first screw, and said first and second hinge components are attached together with a second screw which extends substantially parallel to said first screw.

3. The apparatus of claim 1 wherein said second portion of said connecting member extends substantially coplanar to said first portion thereof at an angle of between about 90° and 180°.

4. The apparatus of claim 3 wherein said first and second portions of said connecting member extend at an angle of 120° with respect to each other.

5. The apparatus of claim 3 wherein said first portion of said connecting member is elongated and includes a front facing which is visually noticeable between said first and second lateral end pieces.

6. The apparatus of claim 1 wherein said first metal hinge component is directly and permanently molded in said plastic connecting member.

7. The apparatus of claim 6 wherein said temple is formed of plastic and said second hinge component is directly and permanently molded in said plastic temple.

* * * * *